United States Patent
Iijima et al.

(10) Patent No.: US 8,387,663 B2
(45) Date of Patent: Mar. 5, 2013

(54) MANIFOLD MADE FROM AMORPHOUS RESIN

(75) Inventors: Katsumi Iijima, Tsukubamirai (JP); Kouji Wada, Kashiwa (JP); Yasunori Yoshida, Toride (JP); Yutaka Yoshida, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 449 days.

(21) Appl. No.: 12/760,937

(22) Filed: Apr. 15, 2010

(65) Prior Publication Data
US 2010/0282347 A1 Nov. 11, 2010

(30) Foreign Application Priority Data
May 11, 2009 (JP) .................................. 2009-114713

(51) Int. Cl.
*F16K 11/24* (2006.01)
(52) U.S. Cl. ...................................... 137/884
(58) Field of Classification Search ............... 137/271, 137/381, 884
See application file for complete search history.

(56) References Cited

U.S. PATENT DOCUMENTS

| | | | | |
|---|---|---|---|---|
| 3,631,881 A | * | 1/1972 | Bowditch | 137/271 |
| 4,898,360 A | * | 2/1990 | VonHayn et al. | 251/129.01 |
| 5,474,108 A | * | 12/1995 | Inden et al. | 137/884 |
| 5,884,664 A | * | 3/1999 | Nagai et al. | 137/884 |
| 6,453,948 B2 | * | 9/2002 | Notz et al. | 137/884 |
| 6,517,761 B2 | | 2/2003 | Yoshida et al. | |
| 7,367,360 B2 | * | 5/2008 | Hidaka et al. | 137/884 |

FOREIGN PATENT DOCUMENTS

| | | |
|---|---|---|
| JP | 5-29187 | 4/1993 |
| JP | 5-57547 | 7/1993 |
| JP | 3775975 | 3/2006 |

* cited by examiner

*Primary Examiner* — John Fox
(74) *Attorney, Agent, or Firm* — Oblon, Spivak, McClelland, Maier & Neustadt, L.L.P.

(57) ABSTRACT

A manifold comprises a base material section made from an amorphous resin, a solenoid valve section including a plurality of solenoid valves made up of valve bodies, and a coupling section including a plurality of pipe couplings. The overall surface of the base material section is covered in a surrounding fashion without pinholes by a protective film, which is a dense layer film made from a chemically stable material. The manifold is surrounded by a protective box as necessary.

9 Claims, 8 Drawing Sheets

MANIFOLD MADE FROM AMORPHOUS RESIN

CROSS-REFERENCE TO RELATED APPLICATION

This application is based upon and claims the benefit of priority from Japanese Patent Application No. 2009-114713 filed on May 11, 2009, of which the contents are incorporated herein by reference.

BACKGROUND OF THE INVENTION

1. Field of the Invention

The present invention relates to a resin manifold, and more specifically to a manifold, which is fabricated from an amorphous resin.

2. Description of the Related Art

In the case that pressurized fluid is made to flow between a plurality of fluid pressure devices, a manifold has been used, with the aim of simplifying the fluid passages and conserving space. In this case, although primarily metallic manifolds have been used, manifolds made of resin materials also are used to facilitate molding thereof, and to make the manifold lighter in weight.

In relation to such a resin manifold, as disclosed in Japanese Patent No. 3775975, the present applicant has proposed a method in which parts are embedded in a base material made from a thermoplastic resin. The method of embedding parts in the base material enables such embedding to be performed easily and at a low cost in an intermediate layer of the base material, without the insert parts becoming inclined with respect to surfaces of the base material. In particular, a thermoplastic resin is used for the base material.

In relation thereto, as a material for the resin made manifold, taking into consideration ease of processing and forming of the manifold, including factors such as dimensional accuracy when the manifold is formed, an amorphous resin has been used. Consequently, because the manifold is made from a resin material, there is a concern of coming into contact with materials that could be a cause of deterioration in durability or product functionality of the manifold.

SUMMARY OF THE INVENTION

A general object of the present invention is to provide a manifold made from a low-cost amorphous resin, which is environmentally resistant and especially excellent in terms of chemical resistance.

The present invention is characterized by a manifold through which a fluid flows, comprising a base material section made from an amorphous resin in which plural fluid passages are formed in the interior thereof, a solenoid valve section disposed on the base material section for controlling introduction and discharging of fluid to and from the fluid passages, and a coupling section that communicates with the fluid passages of the base material section and through which introduction and discharging of fluid is carried out, wherein the base material section is covered in a surrounding fashion by a protective film.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
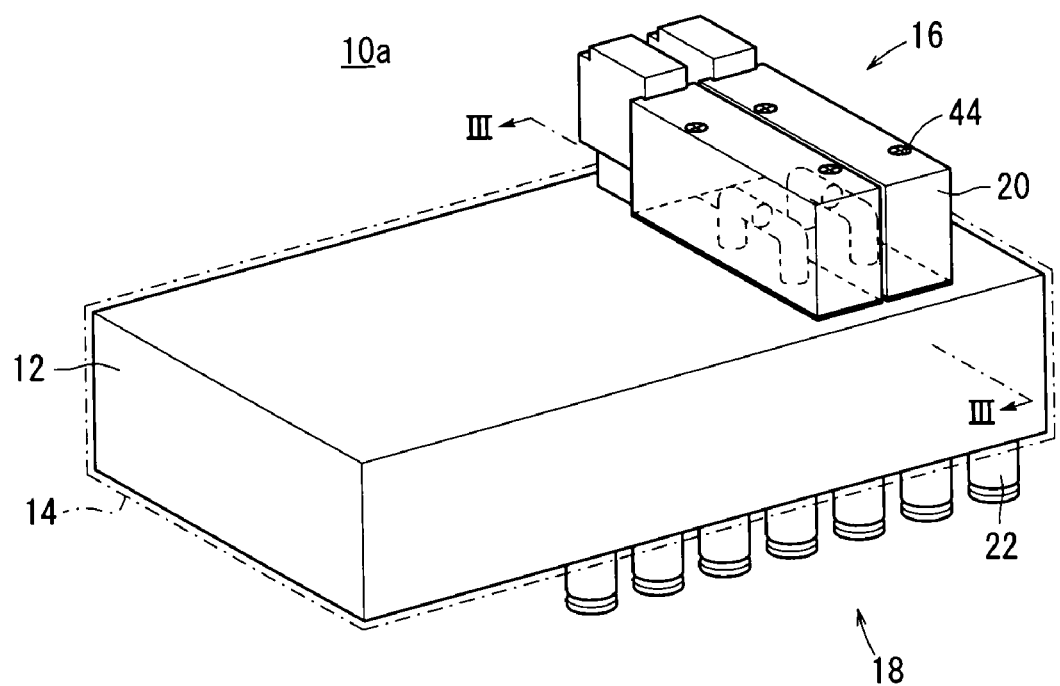
FIG. 1 is a perspective view, with partial omission, of a manifold in relation to a first embodiment of the present invention.

As shown in FIG. 1, a solenoid manifold 10a according to a first embodiment comprises a base material section 12 serving as a manifold main body, a solenoid valve section 16 including a plurality of solenoid valves 20, and a coupling section 18 including a plurality of pipe couplings 22.

The base material section 12 is made from an amorphous resin, and preferably from an acrylic resin having a roughly rectangular parallelepiped shape. The base material section 12 is covered essentially in a surrounding fashion by a protective film 14.

Figure 2:
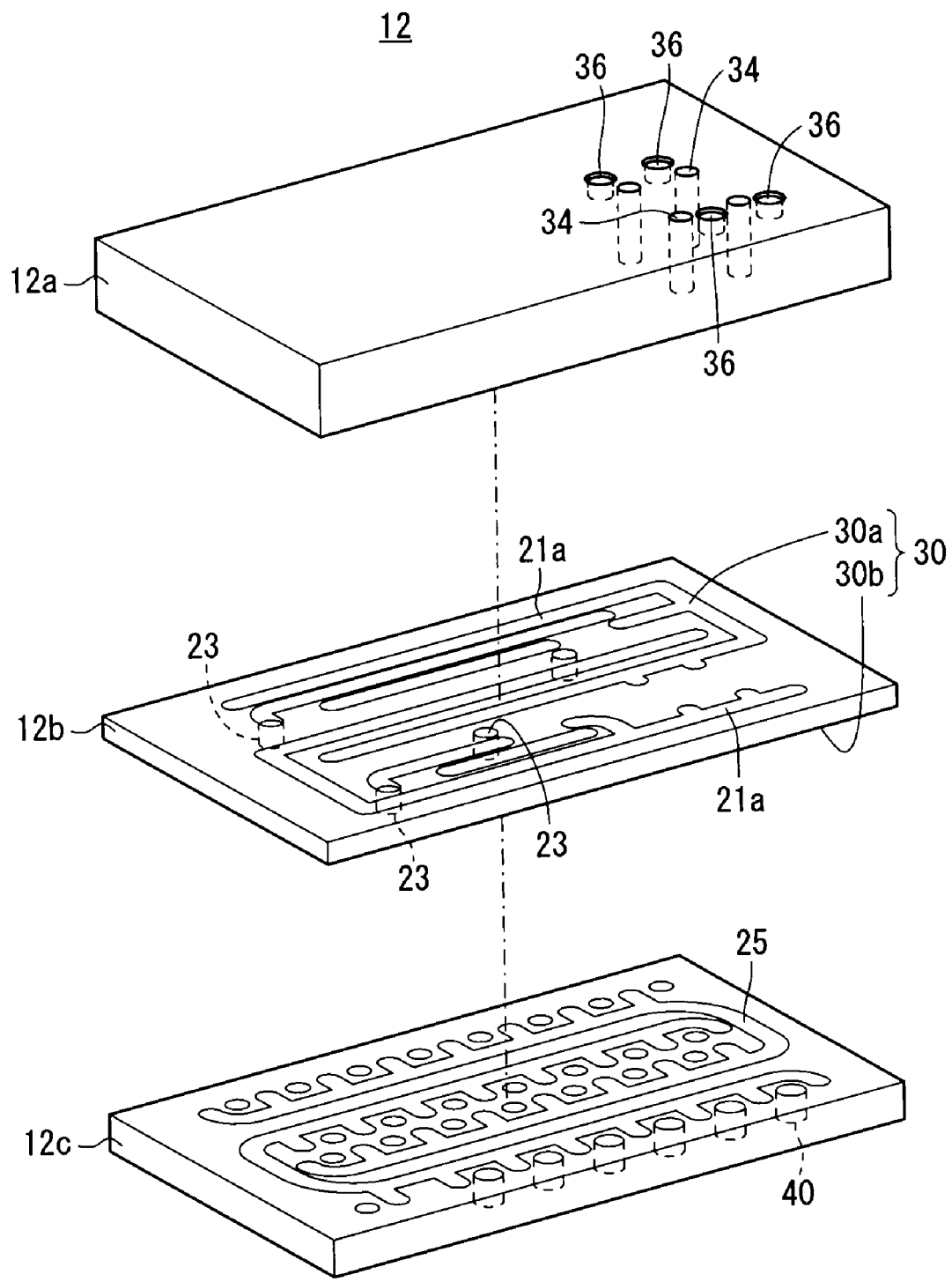
FIG. 2 is an exploded perspective view of a base material section in the manifold of FIG. 1.

As shown in FIG. 2, the base material section 12 is of a three-layered structure made up of a first base material 12a forming an upper layer, a second base material 12b forming an intermediate layer, and a third base material 12c forming a lower layer. Herein, although the base material section 12 is made up of three layers, the number of layers used is not particularly limited.

Figure 3:
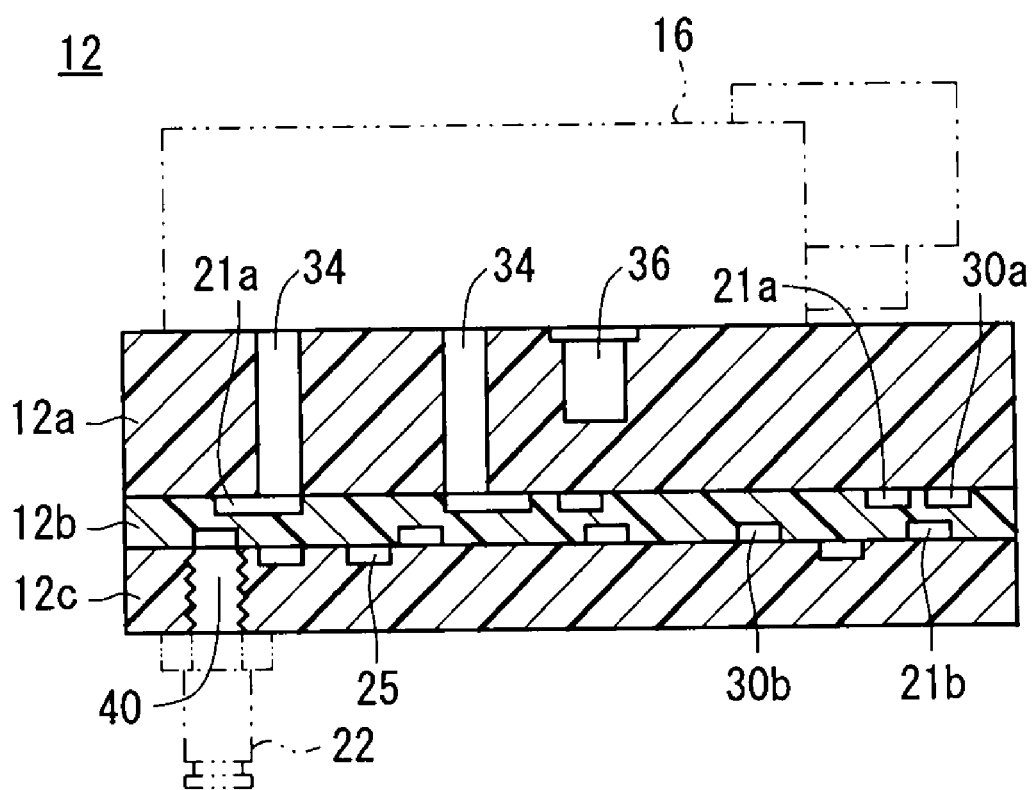
FIG. 3 is a cross sectional view, with partial omission, taken along line III-III of FIG. 1.

Among the first through third base materials 12a, 12b, 12c of the three-layered structure, first, the intermediate second base material 12b shall be explained. As shown in FIG. 2, on upper and lower surfaces of the second base material 12b, plural grooves 21a, 21b are formed respectively in predetermined patterns, and together therewith, holes 23 are formed through which the grooves 21a on the upper surface communicate with the grooves 21b on the lower surface of the second base material 12b (see FIG. 3).

Next, the first base material 12a is stacked onto the upper surface side of the second base material 12b, and holes 34 are formed therein that penetrate through the first base material 12a directed from an upper surface to a lower surface thereof, and which penetrate into the grooves 21a of the second base material 12b. As described later, the holes 34 function as solenoid valve ports when plural solenoid valves 20 are arranged in parallel on the upper surface of the first base material 12a. Further, other holes 36 are formed in the vicinity of the holes 34. Later described nuts 38 are fitted into the other holes 36, and bolts 44, which serve to attach the solenoid valves 20, are screw-engaged with the nuts 38.

On the upper surface of the third base material 12c, grooves 25 are formed in a predetermined pattern, together with threaded holes 40 for pipe couplings 22, which are disposed individually in the vicinity of a longitudinal side edge of the third base material 12c.

In addition, by arranging the second base material 12b so as to intervene between the first base material 12a and the third base material 12c, the grooves 21a, 21b are closed respectively by the first base material 12a and the third base material 12c, whereby fluid passages 30 are formed, which define a plurality of fluid passages through which a fluid (e.g., air) flows. The fluid passages 30 formed between the first base material 12a and the second base material 12b define first fluid passages 30a, whereas the fluid passages formed between the second base material 12b and the third base material 12c define second fluid passages 30b (see FIG. 3).

In the foregoing manner, the first through third base materials 12a, 12b, 12c, which are stacked in three layers, are integrated as a unit and covered in a surrounding fashion by a protective film 14. The protective film 14, for example, covers the overall surface of the base material section 12 in a surrounding fashion without pinholes by the protective film 14, which is a dense layer film made from a chemically stable material, such as a fluorine based coating agent. When the base material section 12 is covered by the protective film 14, the base material section 12 first may be immersed in a solution of the fluorine based coating agent, and then the base material section 12 is taken out from the solution and is allowed to harden.

Figure 4:
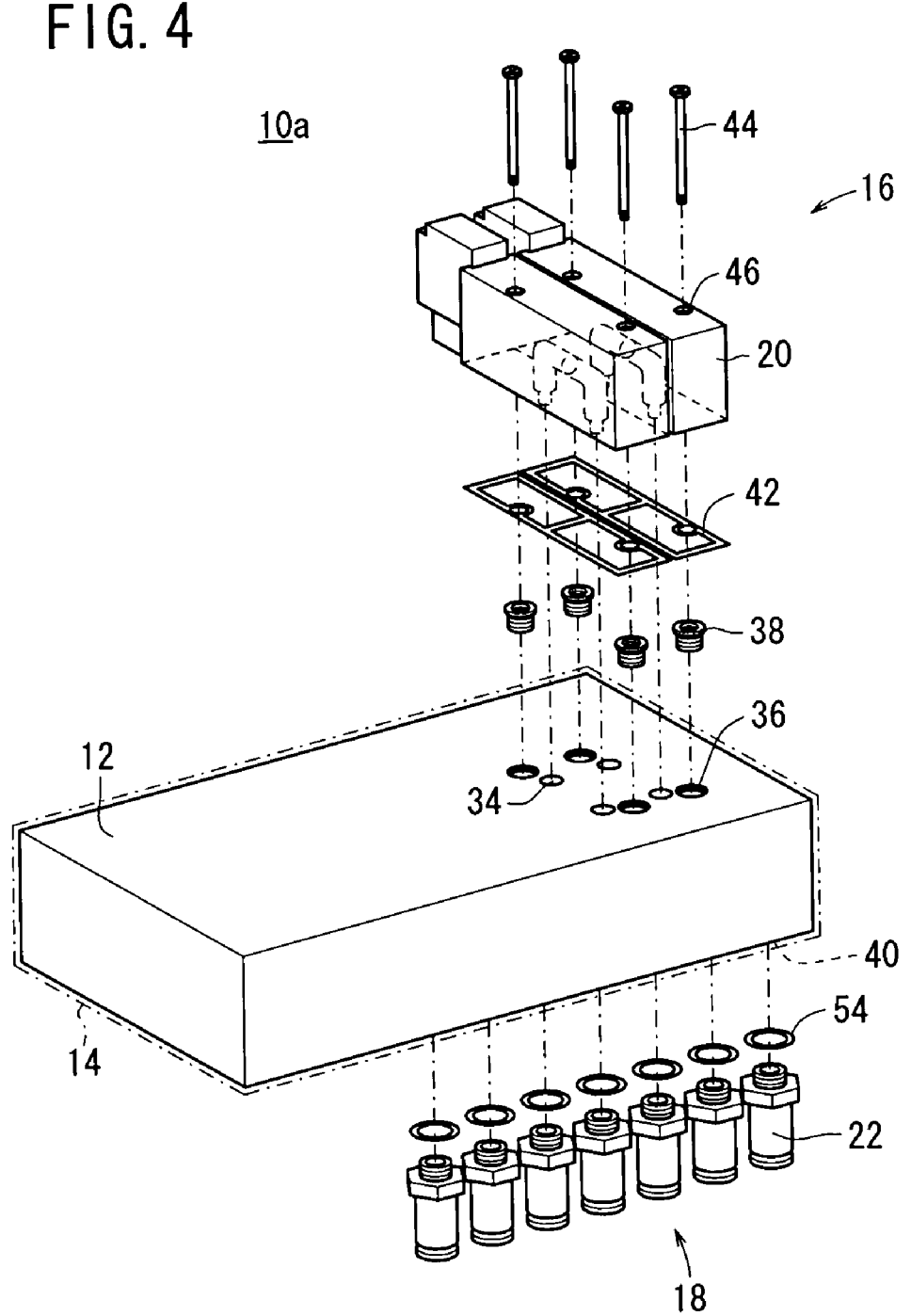
FIG. 4 is an exploded perspective view, with partial omission, of the manifold in relation to the first embodiment of the present invention.

As shown in FIG. 4, the solenoid valve section 16 is made up from a plurality of solenoid valves 20, gaskets 42 that form seals for the solenoid valves 20, and solenoid valve attachment bolts 44 for installing the solenoid valves 20 onto the base material section 12. The solenoid valves 20 are substantially rectangular parallelepiped shaped valve bodies, having non-illustrated solenoid valves and fluid passages formed therein. Solenoid valve attachment holes 46 are provided in the valve bodies.

The solenoid valve attachment holes 46 penetrate through the solenoid valves 20 in a vertical direction as illustrated in FIG. 4.

The solenoid valves 20 are affixed through the gaskets 42 to the first base material 12a of the base material section 12. More specifically, the solenoid valve attachment bolts 44 are inserted through the solenoid valve attachment holes 46, and the screws of the solenoid valve attachment bolts 44 penetrate through the protective film 14 and are threaded into nuts 38 that are fitted into the holes 36.

As shown in FIG. 4, the coupling section 18 is made up from a plurality of pipe couplings 22 with respective seal rings 54, which form sealing members for the pipe couplings 22.

The pipe couplings 22, which are substantially cylindrical with screws on the end portions thereof, penetrate through the protective film 14 and are screw-inserted via the seal rings 54 into threaded holes 40 for the pipe couplings 22, which are disposed in the third base material 12c of the base material section 12.

The manifold 10a according to the first embodiment is basically constructed as described above. Next, operations and effects of the manifold 10a shall be explained.

First, a description shall be made concerning an assembly method for the manifold 10a according to the first embodiment. As a preparatory measure, the first base material 12a in which the plurality of holes 34, 36 are formed, the second base material 12b in which the plural grooves 21a, 21b and the holes 23 are formed, and the third base material 12c in which threaded holes 40 for the pipe couplings 22 are formed, are prepared respectively.

Next, the nuts 38 are fitted into the holes 36 in the upper surface of the first base material 12a (see FIG. 4).

Furthermore, the first through third base materials 12a, 12b, 12c are stacked (see FIG. 2) and are affixed to one another integrally by a non-illustrated means.

Next, the first through third base materials 12a, 12b, 12c are softened by a non-illustrated heating means until reaching a rubbery elastic region, and further, by means of a non-illustrated mold or a pressure fluid, pressure is applied to the first through third base materials 12a, 12b, 12c, so that they are combined together integrally as the base material section 12. Thereafter, the base material section 12 is hardened by cooling while maintaining the pressure-applied state for a sufficient time period, so that a plurality of fluid passages 30 are formed inside the base material section 12. Further, as a result of cooling for a sufficient time period, and due to shrinkage upon hardening, cracks which would otherwise be capable of occurring in the base material section 12 can be minimized as much as possible.

Next, the base material section 12 is immersed in its entirety in a liquid bath comprising a fluorine coating agent, and after removal from the liquid bath, the protective film 14 is formed by drying and hardening for a sufficient time period. Because the fluorine coating agent is a chemically stable material, handling thereof is easy and durability of the protective film 14 is enhanced. Further, by immersion of the base material section 12 in its entirety into the liquid bath, in the same manner as the regions surrounding the holes 34, 36, the nuts 38 and the threaded holes 40 for the pipe coupling, the entire surface of the base material section 12, including even bumpy or irregular portions formed on the base material section 12, can be covered in a surrounding fashion by the protective film 14 without formation of pinholes therein. Additionally, by drying and hardening for a sufficient time period, pinholes and cracks which would be capable of occurring in the base material section 12 due to shrinkage during drying and hardening of the protective film 14 can be avoided as much as possible.

In particular, due to the protective film 14, contact of the base material section 12 with solvents such as carbon tetrachloride, ethanol and thinner as organic solvents including toluene, ethyl acetate, methyl acetate, xylene, methanol, or the like, depending on the environment of use of the manifold 10a, can be prevented as much as possible, and consequently, the formation of solvent cracks in the base material section 12 does not occur.

The above process may be repeatedly carried out multiple times, whereby the base material section 12 may be covered more reliably by a layered or laminated protective film 14. Further, although as described above, the protective film 14 is formed by immersion in a liquid bath made up of the fluorine coating agent, the invention is not limited by this feature. For example, the protective film 14 may be formed by brush coating or spraying the fluorine coating agent, or a film sheet made up from the fluorine coating agent may be applied or adhered to the overall surface of the base material section 12.

Next, the solenoid valve attachment bolts 44 are inserted through the solenoid valve attachment holes 46 of the solenoid valves 20, and through the gaskets 42, the nuts 38 are screw-engaged therewith, and further, by fitting non-illustrated pressure fluid conduits into the holes 34 of the solenoid valves 20, the solenoid valves 20 are affixed to the upper surface of the first base material 12a constituting the base material section 12 (see FIG. 4). Further, by providing the gaskets 42 between the solenoid valves 20 and the base material section 12 which is covered by the protective film 14, when the solenoid valves 20 are affixed thereto, stresses imparted in the surrounding vicinity of the nuts 38 can be lessened, and thus the possibility for generation of cracks in the protective film 14 and the base material section 12 in the vicinity of the nuts 38 due to such stresses can be reduced as much as possible.

Next, via the seal rings 54 on the ends of the threaded side of the pipe couplings 22, the screws thereof are screw-engaged with thread grooves that are formed in the threaded holes 40 for the pipe couplings 22, whereby the pipe couplings 22 are installed onto the lower surface of the third base material 12c constituting the base material section 12 (see FIG. 4).

When the manifold 10a constructed in the foregoing manner is used, a fluid is introduced under pressure into the pipe couplings 22. The pressure-introduced fluid flows from the pipe couplings 22, into the pipe coupling holes 40, and past the second fluid passage 30b, the holes 23, the first fluid passage 30a, and the holes 34, whereupon the pressure fluid reaches non-illustrated pressure fluid passages in the interior of the solenoid valves 20 and is retained therein at a constant pressure.

Next, by means of a non-illustrated power source, the solenoid valve section 16 is energized, and further, by directing control signals to a given solenoid valve 20 from a non-illustrated external controller, a predetermined solenoid valve 20 is driven. More specifically, a valve body (not shown) inside the predetermined solenoid valve 20 is displaced, thereby opening the valve.

Accordingly, the fluid, which is retained at a constant pressure, is introduced from the pressure fluid passage (not shown) inside the solenoid valve 20, past the holes 34, the other first fluid passage 30a, and the holes 23, and is directed into a desired other second fluid passage 30b, as determined by the external controller.

Furthermore, the fluid, which has been introduced to the other second fluid passage 30b, is directed out to the exterior of the manifold 10b via the pipe coupling threaded hole 40 that communicates with the other second fluid passage 30b, and via the pipe coupling 22.

In the foregoing manner, by means of the manifold 10a which is made from an amorphous resin according to the first embodiment, at a low cost, the overall surface of the base material section 12 is covered in a surrounding fashion without pinholes and cracks by the protective film 14. Depending on the environment in which the manifold 10a is used, for example, there is a possibility for solvent cracks to be formed in the acrylic resin base material section 12. For example, contact with certain solvents such as thinner, carbon tetrachloride, or ethanol, etc., can be avoided as much as possible. Therefore, deterioration in the durability of the manifold 10a, or lowering of the hermetic state of the fluid passages 30 formed in the base material section 12, can be suppressed.

Next, a manifold 10b according to a second embodiment shall be described. Structural elements of the manifolds 10b to 10d according to the embodiments described below, which are the same as those of the manifold 10a according to the first embodiment, are designated by the same reference characters, and detailed descriptions of such features shall be omitted.

Figure 5:
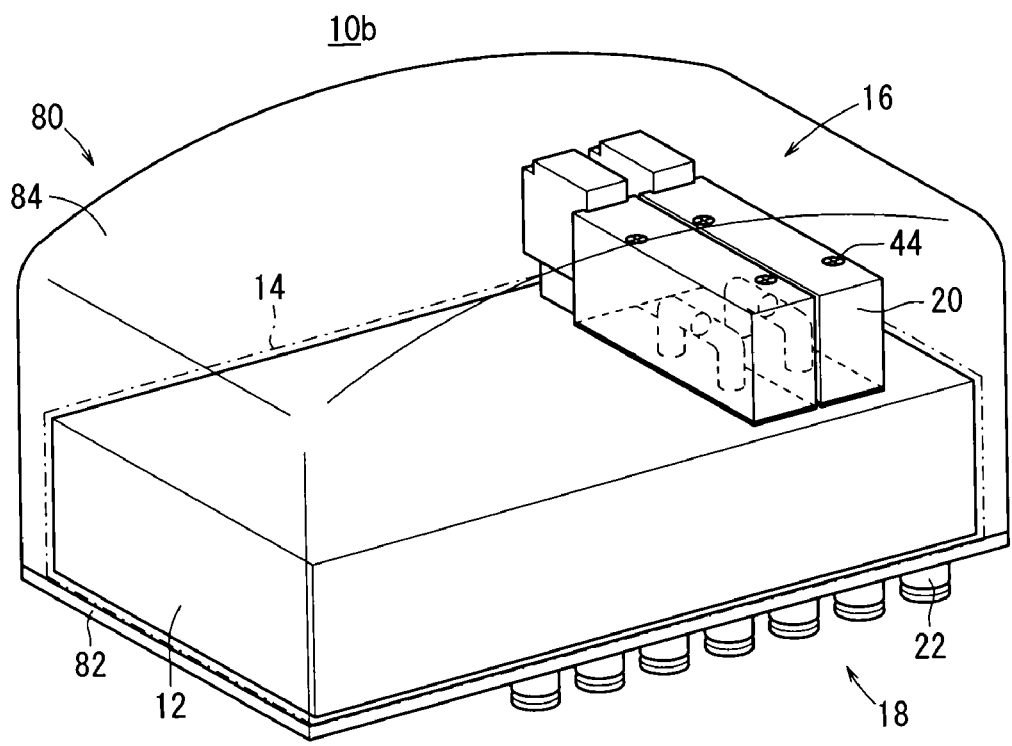
FIG. 5 is a perspective view, with partial omission, of a manifold in relation to a second embodiment of the present invention.
Figure 6:
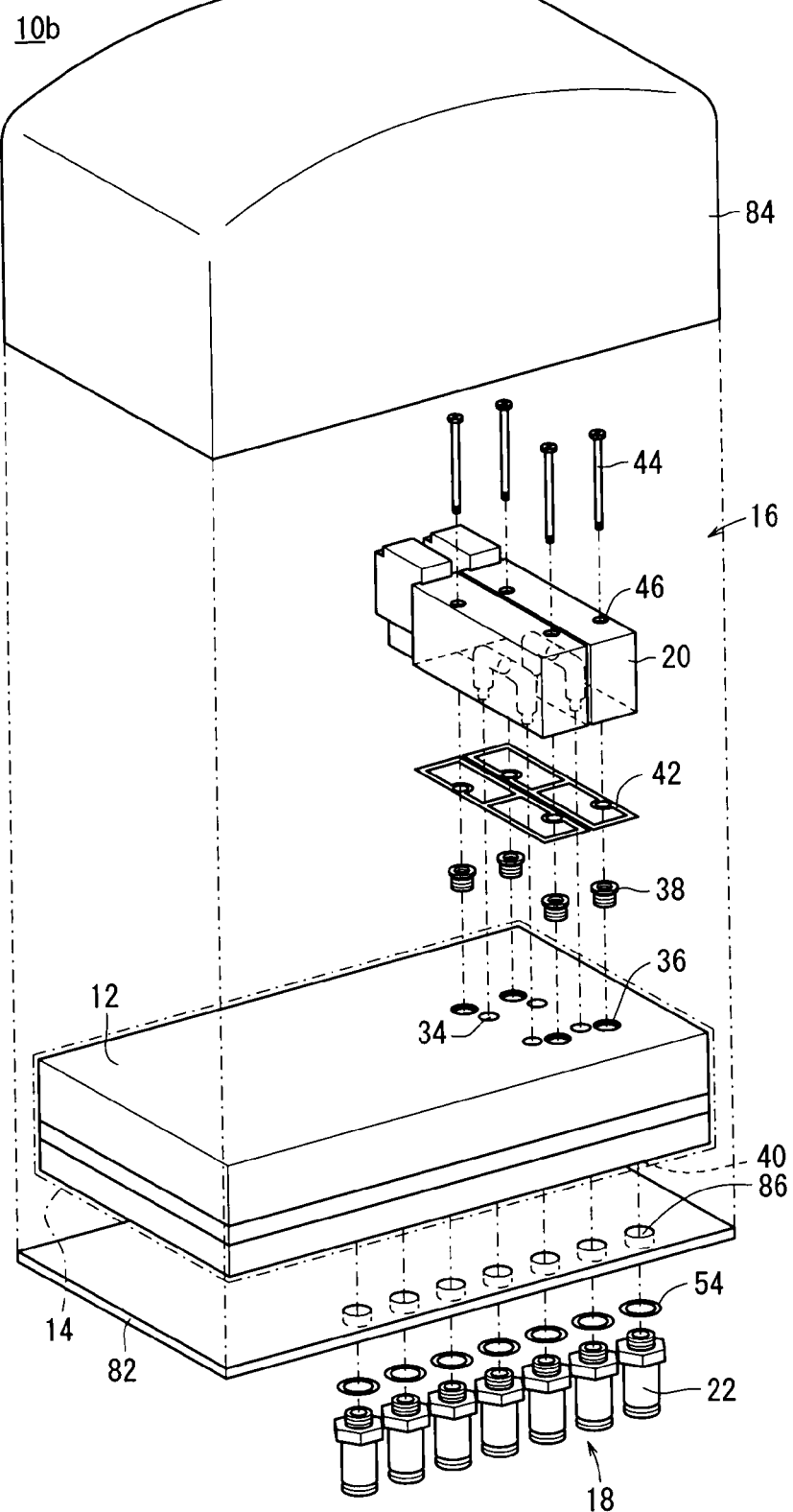
FIG. 6 is an exploded perspective view, with partial omission, of the manifold shown in FIG. 5.

As shown in FIGS. 5 and 6, the manifold 10b comprises a base material section 12 serving as a manifold main body, a solenoid valve section 16 including a plurality of solenoid valves 20, a coupling section 18 including a plurality of pipe couplings 22, and a protective box 80. Stated otherwise, the manifold 10b is of a structure similar to that of the manifold 10a according to the first embodiment, while in addition having the protective box 80.

The protective box 80 is equipped with a bottom plate 82 and a protective cover 84 of a size sufficient to surround the base material section 12 that is covered by the protective film 14 as well as the solenoid valve section 16.

The bottom plate 82, for example, is a plate-shaped body formed from a transparent synthetic resin, having a surface larger than the bottom surface of the base material section 12. Further, plural bottom plate holes 86 are provided in the bottom plate 82 (see FIG. 6).

The bottom plate holes 86 penetrate vertically in a straight line from both surfaces of the bottom plate 82, and have diameters sufficient in size to enable attachment of the pipe couplings 22.

The protective cover 84, for example, is made from a transparent synthetic resin, and has a size sufficient to surround the base material section 12 that is covered by the protective film 14 as well as the solenoid valve section 16.

The manifold 10b according to the second embodiment is basically constructed as described above. According to this embodiment, by surrounding the base material section 12 that is covered by the protective film 14 as well as the solenoid valve section 16 with the protective box 80, a dual protective structured is provided. Depending on the environment in which the manifold 10b is used, for example, contact between the base material section 12 and certain solvents such as thinner, carbon tetrachloride, or ethanol, etc., can be avoided more reliably. Therefore, formation of solvent cracks in the base material section 12 caused by such solvents does not occur.

The protective box 80 of the manifold 10b according to the second embodiment surrounds the base material section 12 that is covered by the protective film 14 as well as the solenoid valve section 16. However, it is sufficient if only the base material section 12 covered by the protective film 14 is surrounded by the protective box 80, and surrounding of the solenoid valve section 16 is not strictly necessary.

Next, a manifold 10c according to a third embodiment shall be described.

Figure 7:
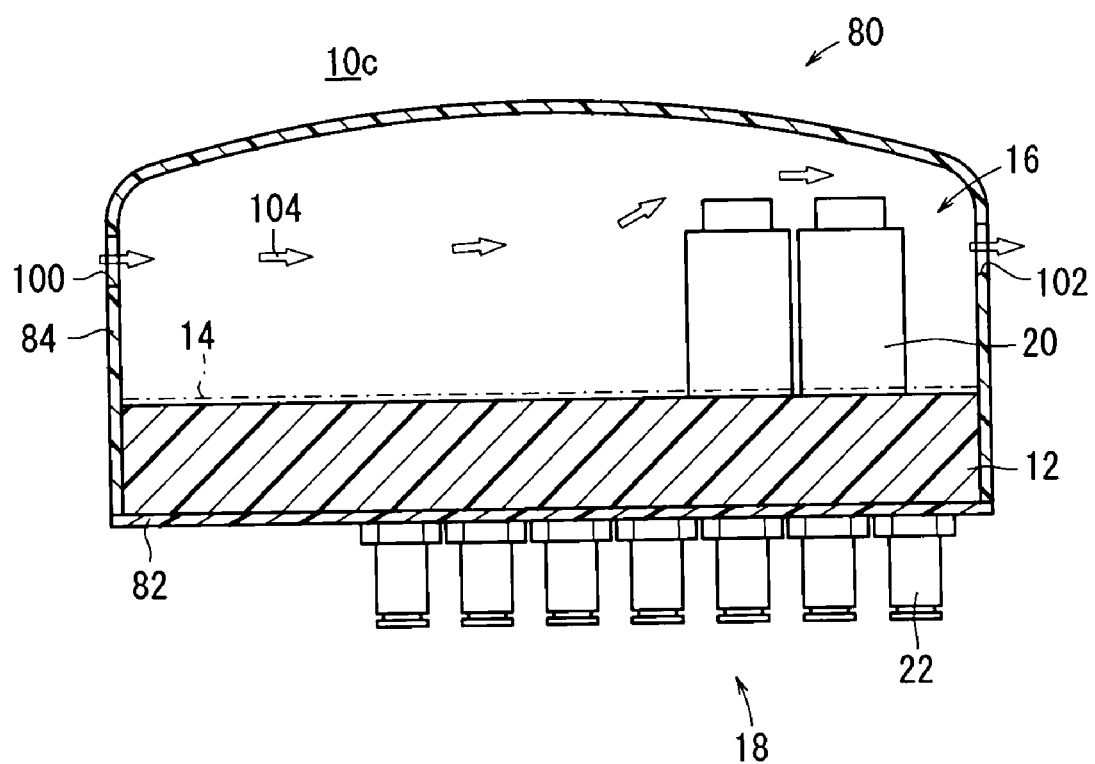
FIG. 7 is a perspective view, with partial omission, of a manifold in relation to a third embodiment of the present invention.

As shown in FIG. 7, a plurality (in this case, two) of openings are provided in the protective cover 84, wherein one of the openings serves as an inlet hole (inlet passage) 100, and the other of the openings serves as a discharge hole (outlet passage) 102. Although two such openings are shown, the number of openings is not limited.

The inlet hole 100 and the discharge hole 102 are disposed such that the distance between the inlet hole 100 and the discharge hole 102 is as long as possible.

The manifold 10c according to the third embodiment is basically constructed as described above. Operations and effects of the manifold 10c shall be explained below.

Through a non-illustrated means, a gas, for example, an inert gas 104, is introduced from the inlet hole 100 under pressure into a space inside the protective box 80. The pressure-introduced inert gas 104 is discharged to the exterior of the protective box 80 from the discharge hole 102 (see FIG. 7).

Because the inlet hole 100 and the discharge hole 102 are disposed such that the distance therebetween is as long as possible, the inert gas 104 pervades completely throughout the space inside the protective box 80. Consequently, depending on the environment in which the manifold 10c is used, retention of solvents such as thinner, carbon tetrachloride, or ethanol inside the protective box 80 can be prevented, whereby contact between such solvents and the base material section 12 can be avoided as much as possible, and therefore, solvent cracks in the base material section 12 do not occur.

Furthermore, by introducing the inert gas 104 under pressure, the pressure in the space inside the protective box 80 is raised higher than the pressure outside the protective box 80. In this case, invasion of fluids apart from the inert gas 104 into the space inside the protective box can be minimized. Accordingly, contact between other fluids and the base material section 12 arranged inside the protective box can be avoided as much as possible, so that deterioration in the durability of the base material section 12, or lowering of the hermetic state of the fluid passages 30 formed in the base material section 12, can be suppressed.

Next, a manifold 10*d* according to a fourth embodiment shall be described.

Figure 8:
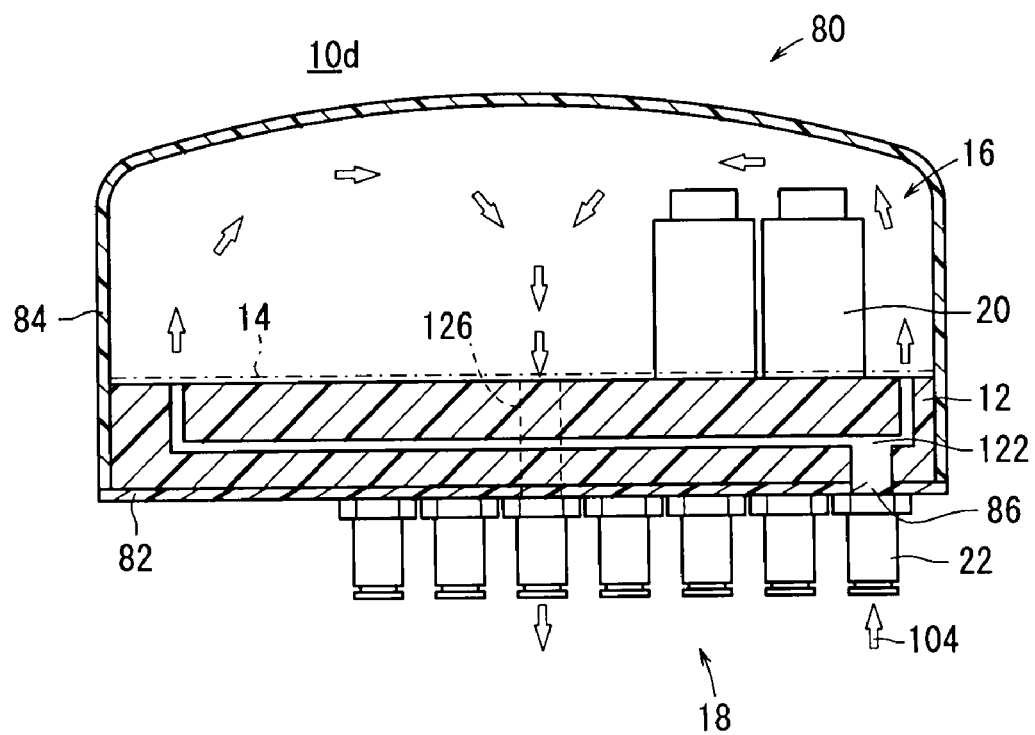
FIG. 8 is a perspective view, with partial omission, of a manifold in relation to a fourth embodiment of the present invention.

In the base material section 12, an introduction passage (inlet passage) 122 is formed, which penetrates, as shown in FIG. 8, from both upper and lower surfaces thereof, opening at an edge portion on the upper surface of the base material section 12 at a plurality of (in this case, two) locations. The introduction passage 122, depending on the type of manifold 10*d*, is connected in communication with a predetermined pipe coupling 22. Although two opening locations are illustrated, the number of such openings is not limited.

Furthermore, on the base material section 12, a discharge passage (outlet passage) 126 is formed that penetrates from upper and lower surfaces, and which opens in the vicinity of the center on the upper surface of the base material section 12. The discharge passage 126, depending on the type of manifold 10*d*, is connected in communication with another predetermined pipe coupling 22 apart from the pipe coupling 22 connected to the introduction passage 122. Although only a single opening location is illustrated, the number of such openings is not limited.

The manifold 10*d* according to the fourth embodiment is basically constructed as described above. Operations and effects of the manifold 10*d* shall be explained below.

Through a non-illustrated means, a gas, for example, an inert gas 104, is introduced under pressure to the predetermined pipe coupling 22. The inert gas 104, which is introduced under pressure to the predetermined pipe coupling 22, passes through the introduction passage 122 and is supplied under pressure into the space inside the protective box 80 from edge portions on the upper surface of the base material section 12. The pressure-introduced inert gas 104 is urged under pressure and rises toward circumferential edge portions at upper ends of the space inside the protective box 80. Furthermore, upon colliding against the protective cover 84, the direction of flow of the inert gas 104 changes and becomes directed toward a central region from the upper end of the space inside the protective box 80.

At this time, as a result of the inert gas 104 being introduced under pressure to the interior of the protective box 80, the pressure in the space inside the protective box 80 becomes higher than the air pressure outside the protective box 80, and therefore the inert gas 104 is directed toward the discharge passage 126 that opens in the vicinity of the central region on the upper surface of the base material section 12, passes through the other predetermined pipe coupling 22, and is discharged to the exterior of the protective box 80 (see FIG. 8).

As a result of the flow of inert gas 104 being generated in the space inside the protective box 80, depending on the environment in which the manifold 10*d* is used, for example, there is a possibility for solvent cracks to be formed in the acrylic resin base material section 12. For example, by preventing solvents such as thinner, carbon tetrachloride, or ethanol, etc., from being retained in the space inside the protective box 80, contact between such solvents and the base material section 12 can be avoided as much as possible, so that deterioration in the durability of the base material section 12, or lowering of the hermetic state of the fluid passages 30 formed in the base material section 12, can be suppressed.

Although the above descriptions have been conducted based on the assumption that the base material section 12 was made from an acrylic resin, the invention is not limited to this feature. For example, the base material section 12 could also be made from vinyl chloride resin or polycarbonate. In this case, similar to the case of forming the base material section 12 from an acrylic resin, solvents that have the possibility of causing formation of solvent cracks in the base material section 12 also are thinners, carbon tetrachloride, or ethanol.

What is claimed is:

1. A manifold through which a fluid flows, comprising:
   a base material section made from an amorphous resin in which plural fluid passages are formed in an interior thereof;
   a solenoid valve section disposed on the base material section for controlling introduction and discharging of fluid to and from the fluid passages; and
   a coupling section that communicates with the fluid passages of the base material section and through which introduction and discharging of fluid is carried out,
   wherein the base material section is covered in a surrounding fashion by a protective film.

2. The manifold according to claim 1, wherein the manifold is covered by a protective box.

3. The manifold according to claim 2, wherein the manifold is pressurized by an inert gas introduced into the protective box.

4. The manifold according to claim 3, wherein the protective box includes an inlet passage through which the inert gas is introduced to an interior of the protective box, and an outlet passage through which the introduced inert gas is discharged.

5. The manifold according to claim 3, wherein the base material section includes an inlet passage through which the inert gas is introduced to an interior of the protective box, and an outlet passage through which the introduced inert gas is discharged, the inlet passage and the outlet passage being connected to the coupling section.

6. The manifold according to claim 2, wherein the protective box is constructed from a bottom plate disposed on a lower part of the base material section, and a protective cover disposed on an upper part of the bottom plate.

7. The manifold according to claim 1, wherein the base material section is constituted by a plurality of stacked substrates having grooves therein that make up the fluid passages.

8. The manifold according to claim 1, wherein the base material section is made from an acrylic resin.

9. The manifold according to claim 1, wherein the protective film is formed from a fluorine based coating agent.

\* \* \* \* \*